United States Patent
Georgis et al.

(10) Patent No.: US 8,310,556 B2
(45) Date of Patent: Nov. 13, 2012

(54) OFFLOADING PROCESSING OF IMAGES FROM A PORTABLE DIGITAL CAMERA

(75) Inventors: Nikolaos Georgis, San Diego, CA (US); Fredrik Carpio, San Diego, CA (US); Adrian Crisan, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 551 days.

(21) Appl. No.: 12/400,136

(22) Filed: Mar. 9, 2009

(65) Prior Publication Data
US 2009/0263012 A1    Oct. 22, 2009

Related U.S. Application Data

(60) Provisional application No. 61/125,166, filed on Apr. 22, 2008.

(51) Int. Cl.
*H04N 5/232* (2006.01)
(52) U.S. Cl. .................................. 348/211.3; 348/211.9
(58) Field of Classification Search ............... 348/211.3, 348/211.9
See application file for complete search history.

(56) References Cited

U.S. PATENT DOCUMENTS

| | | |
|---|---|---|
| 2003/0163833 A1 | 8/2003 | Chiba et al. |
| 2005/0088525 A1 | 4/2005 | Stavely et al. |
| 2005/0219608 A1 | 10/2005 | Wada |
| 2007/0030357 A1* | 2/2007 | Levien et al. ............ 348/211.14 |
| 2007/0104479 A1 | 5/2007 | Machida |

FOREIGN PATENT DOCUMENTS

EP    1 191 783    3/2002

OTHER PUBLICATIONS

Pentaz Versacam brochure, www.pentaxtech.com.
SoftColor Server Automate your image processing Aug. 2008, brochure.
MOBOTIX AG, Changes in Software M10-V2.2.1.10, Release Notes for MOBOTIX Software, http://www.mobotix.com/jpn_JP/region/index/jpn_JP/?URL=content/download/1516/1170 . . . printed Feb. 17, 2009.

* cited by examiner

*Primary Examiner* — James Hannett
(74) *Attorney, Agent, or Firm* — John L. Rogitz

(57) ABSTRACT

Images are offloaded from a portable camera automatically to a network server at the time the images are taken, transparently to a user of the camera. The server executes processing functions on the images and returns the output of the processing over the network to the camera and/or other user-defined destination device to thereby relieve the camera processor of potentially complex processing chores.

13 Claims, 2 Drawing Sheets

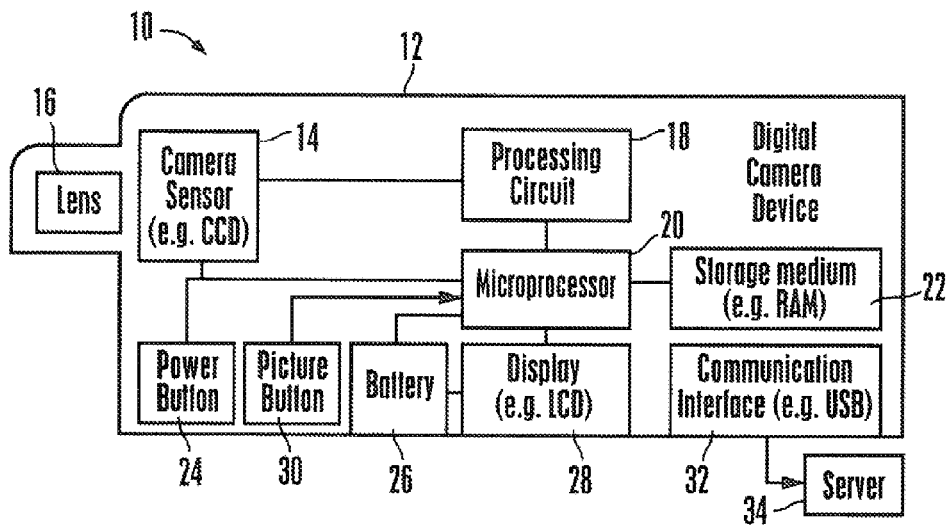
FIG. 1
FIG. 2
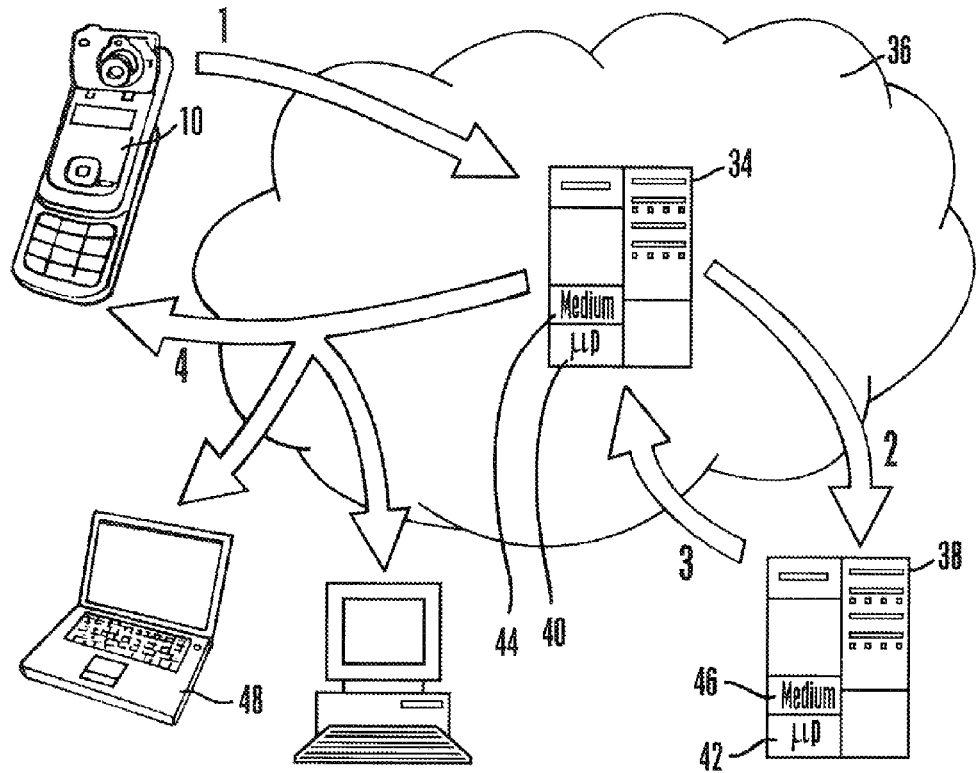

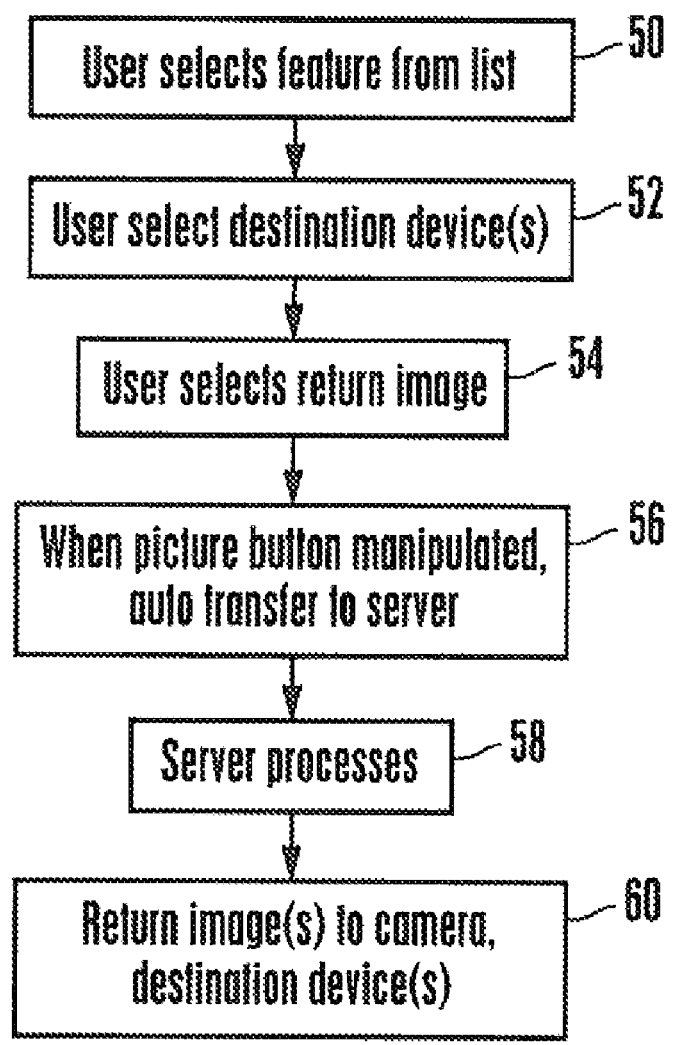

OFFLOADING PROCESSING OF IMAGES FROM A PORTABLE DIGITAL CAMERA

This application claims priority from U.S. provisional patent application 61/125,166, filed Apr. 22, 2008.

FIELD OF THE INVENTION

The present invention relates generally to offloading the processing of images from a portable digital camera.

BACKGROUND OF THE INVENTION

The processing of video images and still images from portable camera devices such as digital cameras, camera-enabled cell phones, etc. is performed by the devices right after capturing. However, because of limited memory, processing power, and bus speed on the portable camera device, only limited types of processing such as re-sizing or rotating images can be performed on the devices, depriving users of such devices of more advanced processing techniques that can be used to enhance the image and video quality.

SUMMARY OF THE INVENTION

As understood herein, the above shortcoming is addressed by offloading complex image processing tasks to a networked server.

Accordingly, an imaging device has a portable housing, an imager such as a CCD supported by the housing, and a picture button on the housing and manipulable by a person to generate one or more images of objects. A processor supported by the housing receives image signals generated by the imager and using a communication interface on the housing, automatically sends the image signals to a server in response to manipulation of the picture button.

In example embodiments the processor receives back from the server processed information derived from the image signals for display and/or storage thereof on the device. Non-limiting implementations of the device may include a visual display supported by the housing and communicating with the processor. The processor can cause a list of processing functions to be presented on the display such that a user may select at least one function from the list for execution of the at least one function by a server receiving the image signals. If desired, the processor may enable a user to define at least one destination device that receives from the server processed information derived from the image signals. Furthermore, the processor may enable a user to define which processed information derived from the image signals is to be sent to the imaging device and to the destination device.

In another aspect, a network server includes a processor and a computer readable storage medium accessible to the processor and bearing instructions to cause the processor to execute logic that includes receiving image signals from an imaging device over a network, and receiving an identification of the imaging device. The logic also includes correlating the identification to at least one image processing function, executing the image processing function to generate a processing output, and correlating the identification to at least one return address. The processing output, potentially user-demanded, is sent to the return address over the network.

In examples, the processing function includes one or more of: compressing raw images, resizing and/or scaling images using an interpolation algorithm, executing histogram equalization on images, executing color enhancement algorithms on images, reducing "red eye" effect in images of people, transcoding images from a first codec to a second codec, deblurring images, filtering noise from images, correction of lens distortion effects, motion compensation to reduce effect of camera shaking and/or object motion, executing super-resolution enhancement techniques on images.

In another aspect, a method includes providing a portable imaging device and programming the device to automatically offload images over a network to a network server at the time the images are generated. The method then includes using the network server to execute at least one processing function on the images to generate an output and returning the output over the network to a destination address.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic block diagram of an example camera;
FIG. 2 is a block diagram of an example system in accordance with present principles; and
FIG. 3 is a flow chart of example logic in accordance with present principles.

DETAILED DESCRIPTION OF THE PREFERRED EMBODIMENT

Referring initially to FIG. 1, a digital camera 10 includes a portable lightweight hand-held housing 12 holding a camera sensor 14 such as but not limited to a charge-coupled device (CCD). The sensor 14 produces images sensed through a lens 16, and in the example non-limiting embodiment shown the images are sent to a processing circuit.

In turn, the processing circuit 18 may communicate with a camera processor 20 in the housing 12, which can access and store data on a computer-readable medium 22. The medium 22 may be, without limitation, disk-based storage and/or solid state storage and in one implementation is implemented by random access memory (RAM). To activate the camera 10, a power button 24 may be provided on the housing 12. A user can manipulate the power button 24 to cause one or more camera batteries 26 to energize the components of the camera 10, including the processor 20 and a visual display 28 such as but not limited to a liquid crystal display (LCD). Also, a picture button 30 typically is provided on the housing 12 that can be manipulated by a user to signal the user's desire to capture a frame (or, in the case of a video camera, multiple frames) as a picture, it being understood that the term "picture button" refers to any user-manipulable element that causes the camera to capture an image or images. Also, a preferably wireless network communications interface 32 such as but not limited to a WiFi interface may be provided to enable the camera processor 20 to communicate with one or more servers described below over the Internet or other network. In other embodiments, a wired communication interface may be used. In any case, it is to be understood that the camera 10 may be implemented as an electronic device with an imaging sensor and storage such as digital cameras per se, camera-equipped mobile phones, personal digital assistants (PDAs), and notebook computers with built in cameras.

Now referring to FIG. 2, the camera 10, using the interface 32, communicates with a synchronization server 34 over a network 36. In turn, the synchronization server 34 communicates with a processing server 38, it being understood that the functionality described herein may be implemented by a single server, by two servers as shown, or by more than two servers. In any case, each server 34, 38 includes one or more respective processors 40, 42 accessing respective computer-readable storage media 44, 46 to execute image processing tasks in accordance with principles below, and to return various outputs of the image processing to the camera 10 as well as to one or more destination devices 48 such as a user notebook computer, personal computer, multimedia player, etc. on the network 36 as designated by the user of the camera 10.

FIG. 3 shows logic that may be implemented by the camera 10. At block 50, the user of the camera 10 is given the opportunity to select enhanced processing functions to be performed by the server from, e.g., a price list of functions. The selection may be afforded by presenting a setup screen on the display 28 from which the user may select the desired functions, with the list of functions presented being prestored in the camera 10 and/or received in real time from the server 34. Or, it may be done by allowing the user to select the functions at point of purchase, with the vending outlet then relaying the desired functions to the server along with, e.g., the camera identification. In the former case, the camera identification may be sent from the camera 10 along with the desired functions and image at the time the image is taken, and in the latter case only the camera identification with images need be sent to the servers.

Also, at block 52 the user of the camera 10 may select (by entering, e.g., IP addresses MAC addresses) the destination devices 48 shown in FIG. 2. This selection may use one of the selection methods described above in the case of desired functions or other appropriate method. Further, at block 54 the user of the camera selects (from, e.g., a list of "return" features that may be presented on the display 28) which information from the server the user desires to be sent back to the camera 10, including the option of "none". For example, the user may select to forward a processed image file to a destination device or to forward the original version of the image file.

Then, at block 56, when a user manipulates the picture button 30, the camera processor automatically sends the image data resulting from manipulation of the picture button to the server or servers described above. Thus, the images from the camera 10 are automatically offloaded to the network server immediately upon being generated by manipulating the picture button, along with the camera identification. In this way, the transmission of multimedia content from the camera 10 to the server and back is performed transparently to the user.

The synchronization server 34 receives the images and camera identification and looks up the processing functions desired by the user as described above. Then the synchronization server 34 may either execute the processing functions or may cause the processing server 38 (when separate servers 34, 38 are provided) to execute the functions. The desired processing is executed and when separate servers 34, 38 are provided, returned to the synchronization server 34, which looks up the user-defined destination devices input at block 52 and return information input at block 54 and at block 60 sends the corresponding outputs of the processing executed at block 58 to the corresponding devices. Default processing functions and return information may be provided in the absence of user input of desired functions and outputs. The user can be billed for each processing function executed by the servers 34, 38.

The processing functions executed by the servers 34, 38 alone or in cooperation with each other may include, as example, compressing raw images using an advanced codec, resizing and/or scaling images using an interpolation algorithm, executing histogram equalization on images, executing color enhancement algorithms on images, reducing the "red eye" effect in images of people, executing geometric transformations, deblurring images, filtering noise from images, dynamic range expansion, correction of lens distortion effects, motion compensation to reduce the effect of camera shaking and/or object motion, executing super-resolution enhancement techniques, and stitching together multiple images to produce mosaics and panoramas. In the case of video, the processing executed by the servers may include transcoding from one codec to another, e.g., from MPEG to AVC or MPEG to WMV, with digital rights management added thereto, scaling video images, etc.

Additional storage on the camera 10 can be also offered by means of mapping a networked drive that can store the processed multimedia content.

What is claimed is:

1. Network server, comprising:
processor;
at least one computer readable storage medium accessible to the processor and bearing image processing functions and respective imaging device identifications such that the processor can ascertain which image processing functions to execute on an image from an imaging device using an identification of the imaging device as entering argument, the at least one computer readable storage medium further bearing instructions to cause the processor to execute logic comprising:
receiving image signals from an imaging device over a network;
receiving an identification of the imaging device, the server not receiving desired image processing functions from the imaging device;
correlating the identification to at least one image processing function contained on the at least one computer readable storage medium;
executing the image processing function to generate a processing output;
correlating the identification to at least one return address; and
sending the processing output to the return address over the network.

2. Server of claim 1, wherein the logic comprises:
determining which one of plural processing outputs to send to a return address based on a user-demanded return image.

3. Server of claim 1, wherein the processing function includes compressing raw images.

4. Server of claim 1, wherein the processing function includes resizing and/or scaling images using an interpolation algorithm.

5. Server of claim 1, wherein the processing function includes executing histogram equalization on images.

6. Server of claim 1, wherein the processing function includes executing color enhancement algorithms on images.

7. Server of claim 1, wherein the processing function includes reducing "red eye" effect in images of people.

8. Server of claim 1, wherein the processing function includes transcoding images from a first codec to a second codec.

9. Server of claim 1, wherein the processing function includes deblurring images.

10. Server of claim 1, wherein the processing function includes filtering noise from images.

11. Server of claim 1, wherein the processing function includes correction of lens distortion effects.

12. Server of claim 1, wherein the processing function includes motion compensation to reduce effect of camera shaking and/or object motion.

13. Server of claim 1, wherein the processing function includes executing super-resolution enhancement techniques on images.

* * * * *